2,817,672

PROCESS FOR THE PREPARATION OF ACYLATED DERIVATIVES OF N-SUBSTITUTED LACTAMIDES

Martin L. Fein, Riverside, N. J., and Edward H. Harris, Jr., and Edward M. Filachione, Philadelphia, Pa., assignors to the United States of America as represented by the Secretary of Agriculture No Drawing. Application May 22, 1953
Serial No. 356,911

7 Claims. (Cl. 260—404)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to acylated derivatives of N-substituted lactamides and has among its objects the provision of a process for producing such products in substantially pure yield, in a short reaction time, and which avoid the use of acyl chlorides and anhydrides as reagents. Other objects will be apparent from the description of the invention.

According to the invention, a mixture containing lactic acid, an acylating organic acid comprising a saturated fatty acid having from 2 to 12 carbon atoms, such as acetic, propionic, caproic, 2-ethylhexanoic, pelargonic, and lauric acids, preferably the saturated fatty acids having from 6 to 12 carbon atoms, and an amine selected from the group consisting of dibutylamine, 2-hydroxyethylamine, 2-hydroxypropylamine, and bis-(hydroxyethyl)amine, is heated, preferably at refluxing temperature, with concurrent removal of water, thereby simultaneously forming the amide and ester linkages by dehydration to produce acylated N-substituted lactamides.

The reaction is preferably carried out in the presence of a water-entraining agent, which may be any inert solvent that has a boiling point of about from 80° to 200° C., forms an azeotrope with water, and is immiscible with water, such as xylene. Or such an entrainer can be dispensed with entirely and the water removed directly by distillation, preferably under vacuum. Even when volatile acids and amines are used as reagents, they are largely bound as salts in the reaction mixture and do not readily boil out.

In carrying out the process, it is essential that the three reactants namely, the lactic acid, the organic acylating acid, and the amine, be heated simultaneously, that is, the N-substituted lactamides should not be separately produced and then acylated. The following experiment, which serves as a contrast with the examples following thereafter, indicates the results obtained when the lactamide is first produced and then acylated.

129.2 g. of dibutylamine was added slowly to 112.5 g. of 80 percent lactic acid. Then 100 ml. of xylene was added and the mixture was refluxed 9 hours with continuous removal of water, thus to form dibutyllactamide in high yield and purity. Next, 180 g. of lauric acid and 1 g. of p-toluenesulfonic acid were added and the mixture was refluxed an additional 24 hours, water again being removed as fast as formed. Early in this second stage enough xylene was withdrawn to raise the temperature of the reaction mixture to about 160° C. The amount of water removed in this stage of the preparation was less than half of the theoretically expected amount. The remaining xylene was removed by vacuum distillation and the residue was distilled insofar as possible in an alembic still under high vacuum. Almost half of the lauric acid was removed as a low-boiling fraction. About 0.2 mole (20% of the theoretic amount) of dibutyllactamide laurate was distilled from the residue and distillation then ceased because of decomposition in the stillpot. A large undistillable residue remained.

Similar results were obtained by use of the other amines and other fatty acids.

The following examples are illustrative of the invention.

EXAMPLE I

*Preparation of N,N-dibutyllactamide laurate*

129.2 g. of dibutylamine, 112.5 g. of 80 percent lactic acid, 180 g. of lauric acid and 100 ml. of xylene were mixed and refluxed with continuous removal of water. When production of water became slow, enough xylene was removed to raise the temperature of the reaction mixture to about 160° C. The theoretical amount of water was removed in 15 hours, at which point production of water practically ceased.

The remaining xylene was removed by vacuum distillation and the residue was distilled insofar as possible in an alembic still under high vacuum. No lauric acid was recovered and little distillation residue remained. After redistillation of the main fractions there was obtained 0.7 mole (70% yield) of N,N-dibutyllactamide laurate and 0.2 mole (20% yield) of N,N-dibutyllactamide. Experiment showed that the latter could be recycled in the process and ultimately converted to laurate.

EXAMPLES II TO VI

By proceeding substantially as described in Example I above, except that the appropriate amines and fatty acids were substituted for the dibutylamine and lauric acid, the following acylated lactamides were prepared in good yield:

II. N,N-dibutyllactamide caprate
III. N-2-hydroxyethyllactamide di-2-ethylhexanoate
IV. N-2-hydroxyethyllactamide di-pelargonate
V. N-2-hydroxypropyllactamide diacetate
VI. N,N-bis-(hydroxyethyl) lactamide tri-propionate As was to be expected, the use of hydroxyalkyl amines, as in Examples III to VI, yielded acylated lactamides in which the hydroxyl groups of the amines as well as that of the lactic acid were acylated. In these cases the yields were somewhat lower, due to the higher functionality of the reagents used, but otherwise, the results were in accord with those obtained with mono- and dialkylamines.

While we have been able to use glycolic and similar hydroxy acids instead of lactic acid in our process, the process is less satisfactory and the products are less desirable than when lactic acid is used.

Having thus described our invention, we claim:

1. A process of preparing an acylated N-substituted lactamide comprising heating a mixture containing lactic acid, a saturated fatty acid having from 2 to 12 carbon atoms, and an amine selected from the group consisting of dibutylamine, 2-hydroxyethylamine, 2-hydroxypropylamine, and bis-(hydroxyethyl)amine, with concurrent removal of water formed.

2. The process of claim 1 wherein the amine is dibutylamine.

3. The process of claim 1 wherein the amine is 2-hydroxyethylamine.

4. The process of claim 1 wherein the amine is 2-hydroxypropylamine.

5. The process of claim 1 wherein the amine is bis-(hydroxyethyl)amine.

6. The process of claim 1 wherein the fatty acid is lauric acid and the amine is dibutylamine.

7. The process of claim 1 wherein the saturated fatty acid is one having from 6 to 12 carbon atoms.

References Cited in the file of this patent

UNITED STATES PATENTS

| 2,259,466 | Harris et al. | Oct. 21, 1941 |
| 2,238,928 | Cahn et al. | Apr. 22, 1941 |
| 2,644,009 | Cahn et al. | June 30, 1953 |